Jan. 18, 1966     D. AKERS     3,230,124
METHOD OF MOLDING AN ARTICLE FROM WOOD PARTICLES
HAVING SUPERIOR IMPACT RESISTANCE
Filed Sept. 14, 1962     2 Sheets-Sheet 1

INVENTOR.
DAVID AKERS

BY
his ATTORNEYS

FRAGMENTED WOOD MATERIAL

DUST WITH MIXTURE OF STARCH AND RESIN ABOUT (1) QUART OF MIXTURE TO ABOUT (30) LBS. OF WOOD FRAGMENTS:

WOOD TREATING MIXTURE

MIX ONE PART POLYVINYL (55% RESIN CONTENT) EMULSION WITH FIVE PARTS WATER TO FORM UNIFORM MIXTURE. ADD TO MIXTURE A 75% PHOSPHORIC ACID SOLUTION IN RATIO OF ABOUT 8 OZ. OF PHOSPHORIC ACID TO 12 QUARTS OF P.V.A.-WATER MIXTURE. LET STAND IN AMBIENT ATMOSPHERE ABOUT 40°F. FOR 20 TO 60 MINUTES:

MIX DUSTED WOOD FRAGMENTS WITH WOOD TREATING MIXTURE IN RATIO OF ABOUT 30 POUNDS WOOD FRAGMENTS TO ABOUT 12 QUARTS OF WOOD TREATING MIXTURE AND STIR FOR MINIMUM OF FIVE TO SEVEN MINUTES. STORE IN AMBIENT TEMPERATURES NOT LESS THAN 40°F. TO REDUCE MOISTURE CONTENT TO 10% AND ABOVE:

PRESS TREATED WOOD FRAGMENTS AT TEMPERATURES BETWEEN 90°F. AND 263°F. AND SUITABLE PRESSURES TO PRODUCE REQUIRED CHARACTERISTICS

MOLDED ARTICLE

FIG. 4.

United States Patent Office 3,230,124
Patented Jan. 18, 1966

3,230,124
METHOD OF MOLDING AN ARTICLE FROM WOOD PARTICLES HAVING SUPERIOR IMPACT RESISTANCE
David Akers, Baltimore, Md., assignor to Vida Products, Inc., Baltimore, Md., a corporation of Maryland
Filed Sept. 14, 1962, Ser. No. 223,633
15 Claims. (Cl. 156—228)

This invention is directed to a method of making wood products and it relates particularly to products made from the detritus of lumber and wood working operations, such as sawdust, wood flour, shavings, chips, shreds, etc., together with a binder and to the process for bonding and forming such an article.

Various processes have heretofore been used where wood substances such as wood flour, sawdust, excelsior and other more or less finely divided wood substances have been used with a binder, either organic or inorganic, but such materials have properties, such as being too soft, too brittle, too heavy, too costly to mold into usable shapes, or too readily affected by weather that prevent their use for many purposes as a substitute for wood. It is of course well known to use wood flour as a filler for plastic molding compounds, but articles formed therefrom partake the appearance and quality of the plastic with little evidence of the wood.

According to the present invention waste wood materials of the kinds above mentioned preferably in mixed or heterogeneous sizes is combined with a combination of organic and inorganic bond developing substances and shaped under heat and pressure. Shaping of the products may be effected under pressure employing known processes of molding, extruding and pressing. The product may be solid or hollow and of uniform or non-uniform thickness. The product may be partially shaped in a die or mold and removed therefrom for further machining with special tooling such as carbide tipped cutting tools.

Due to the unusual characteristics of the wood after treatment by the process of the invention both hollow and solid products may be pressure formed to final dimensions in partial sections and assembled into unitary final shape. The resulting bonding medium which develops under heat and pressure remains adhesive until the product cools so that upon removal of the formed piece from the mold it has adhesive qualities sufficient to enable two or more pieces in this condition to be clamped together and inseparately joined. The parts so joined become practically a monolithic body no more susceptible of breakage at the joint than elsewhere. This enables special shapes to be separately molded and thereafter bonded together so that such articles can be produced in final form from easily shaped sections.

My invention has for an important object to mold an article from waste wood chips, shavings, sawdust, wood flour and shreds and mixtures of some or all of such materials, such formed article having unique properties and being usable for making many articles from which lumber or other materials have heretofore been required.

A further important object of this invention is to provide an improved method of preparing divided wood substances of this character for molding and preparing a moldable mix therefrom.

A further important object is to utilize an improved bonding substance for such wood substances in making products that are formed under heat and pressure.

A further object of the invention is to utilize a mixture of divided wood particles of the type above described and bond developing substances which can be molded, extruded or pressed under heat and pressure to form hard, strong, substantially water impervious bodies.

A still further object is to mold an article made from fragmentary wood substances and bonding material initially formed in separate sections under heat and pressure and which are then autogenously bonded together while hot into a monolithic body.

These and other objects and advantages are secured by this invention as will hereinafter appear from the following detailed description in conjunction with the accompanying drawings in which.

Figure 1:
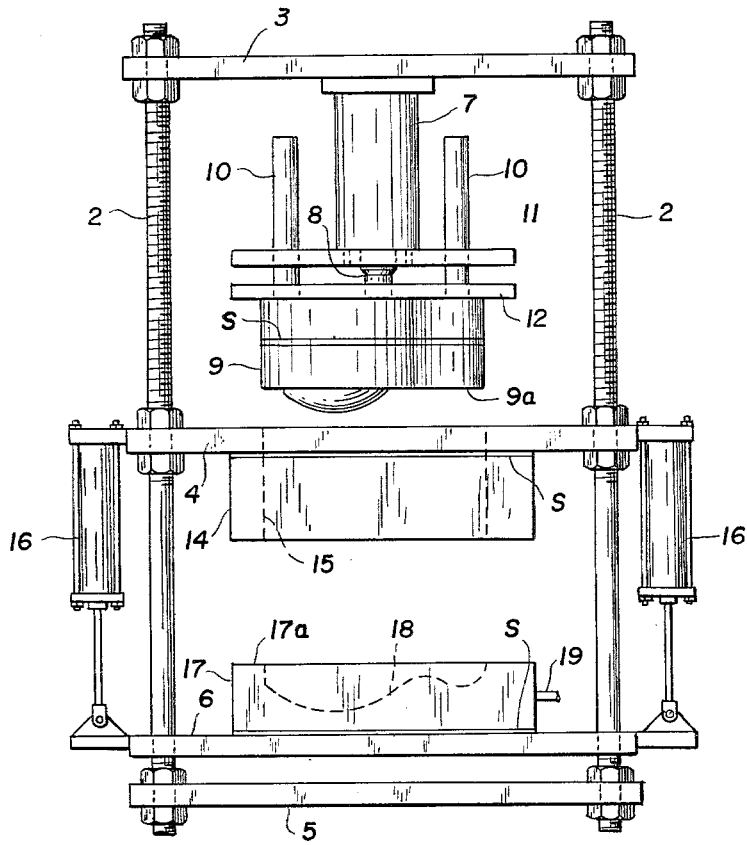
FIG. 1 shows more or less schematically one form of a press used to mold a single half section of an article, such as a bowling (duck) pin, the view showing a front elevation of the press.

It may be explained that since the invention is highly suitable for the manufacture of bowling pins because of the high impact resistance of the material and its nonsplitting non-chipping qualities and extreme hardness, but which nevertheless otherwise simulates the behavior of wood pins, the invention is here described in connection with bowling pins, but this is not to be construed as limiting the invention to such use and articles, but is typical and illustrative of the product and process.

This invention is applicable to wood material from either deciduous trees or conifers. Generally, in places where the wood material is collected one variety or another will predominate, and the bonding material is adjusted within broad limits, as hereinafter explained, according to the kind or class of wood that predominates. The age of the wood, so long as it is sound and not decayed makes no material difference. It may be derived from green lumber, kiln dried lumber or from ancient boards from the wrecking of old houses or the like.

As stated above, the wood material, herein generically referred to as fragmented wood or wood fragments may comprise sawdust, shavings, shreds, chips and wood flour and mixtures of two or more of such fragmentary material. Ordinary amounts of bark may be tolerated. While fragment size is not critical, chips desirably should not exceed about two inches in length or exceed three eighths of an inch in thickness, and for small objects of very hard dense wood, the invention can be best carried out with chips of less than maximum thickness. Shavings may be cut with or across the grain. Shreds, such as excelsior waste or chopped excelsior may be used. The waste from a shop engaged in dressing lumber or doing mill work is good because it is usually a mixture of coarse and fine planing machine debris, coarse and fine sawdust and wood flour. Such hetergeneous mixtures of coarse and fine fragments is desirable.

The materials used in the process in addition to the fragmented wood are:

(a) Starch, industrial or commercial grade. It may be corn or potato starch.
(b) Finely pulverized wood resin. A grade such as that sold under the trademark "Vinsol" (see Reinhold Condensed Chemical Dictionary," 6th edition) has been found satisfactory, also rosin.
(c) Phosphoric acid, preferably 75% solution, other strength solutions are usable and desirable depending upon the species of wood used.
(d) Polyvinyl acetate latex or emulsion of about 55% PVA actual resin content, such resin content is not critical as hereinafter discussed.
(e) Water.
(f) Formaldehyde, which is optional.

According to this invention, a uniform dry mix is prepared with the starch and resin, preferably in the approximate proportions of six parts of corn starch to one part of resin, by volume.

This mix is used in the approximate proportion of one quart of the resin-starch mix to 30 lbs. of wood fragments. The wood fragments and resin-starch mix are agitated or tumbled together in a suitable mixer to distribute the starch-resin mix over the wood fragments, the dry mix adhering to the wood fragments.

One part of polyvinyl acetate emulsion, preferably homogenized and of 55% actual resin content, is mixed with five parts of water and these ingredients are stirred to form a uniform mix. For each twelve quarts of PVA-water mix there is added about eight ounces of 75% phosphoric acid solution. After the phosphoric acid has been thoroughly mixed with the PVA-water mix the resulting liquid mixture should stand at room temperature above 40° F. for a period of about 20 to 60 minutes for ambient relative humidities between 10% and 100%. The drier the air the less time is required. Longer time periods cause deterioration of the effectiveness of the solution and a resultant loss of fluidity.

This solution may be termed a temporary bonding and wood treating solution, causing the wood to become pliable and to reactivate the natural resins in the wood to provide the final bonding medium. The exact manner in which such a solution causes the wood to become pliable and to reactivate the natural resins in the wood is not presently fully understood. It appears, however, that the PVA serves as an immediate temporary bond and the natural wood resins the final binder under pressure and controlled uniform heat. The phosphoric acid in the solution appears to have some reaction with the PVA acting somewhat as a partial catalyst to accelerate the bonding action of the PVA and a major function of effecting an endothermic reaction with the wood releasing the natural resins therein and causing the wood to become pliable and compressible. Other acids have been tried including lactic acid, sulphuric, hydrochloric, acetic acids. These, however, were found to be too weak or too strong. Acetic acid from 8% to 65% solutions were used. Less than 22% failed to release the natural wood resins with resultant loss of pliability. Above 22% was partially effective but seemed to scorch the wood, weakening the natural fibers and failed to provide a good bond. Sulphuric and hydrochloric acids produced noxious fumes and were too corrosive to the molds. Phosphoric acid appears to be the most compatible with the wood, providing the best bond strength and pliability in the wood and safest to handle.

To the bonding solution as prepared above may be added four ounces of formaldehyde. Formaldehyde appears to produce a superior product, but its use is optional.

The wood fragments which have been dusted with the starch-resin mix are combined with the bonding and wood treating solution in an agitating mixer for a minimum period of about five to seven minutes, during which an endothermic reaction takes place between the solution and wood fragments. The resulting mass of wood fragments and solution mix is then removed and put aside for a sufficient period to permit the moisture in the mix to reduce to about 10% in an ambient atmosphere of not less than 40° F. It has been observed that such mass of wood fragment and solution may stand for longer periods, at not less than 40° F., but it may then be necessary to add sufficient moisture to establish about a 10% content. Less than 10% moisture content impairs the physical characteristics of the final product. Moisture materially in excess of 10% requires the same pressing temperatures but necessitates longer retention time in the mold and loses density after removal from the mold.

The wood fragments after reduction to about 10% moisture are then ready to be formed into a finished product. The treated fragments are compacted under controlled heat and pressure in this step. The treated wood fragments and the die or mold are uniformly heated to molding temperature and a measured quantity of the heated fragments are then compacted into the heated mold cavity to form the desired shape and to effect a uniform density throughout each area thereof. The pliable treated wood fragments when uniformly heated flow readily into the contours of the mold cavity. The molding temperature may range from between 90° F. and 263° F., depending upon the wood mixtures used, thickness of the article being shaped and the desired strength in the finished product.

The period of application of full pressure may vary from about 6 to 10 seconds per ounce of treated wood fragments being compacted having about 10% by weight of water content. Increased percent by weight of water requires longer retention time of the fully compacted material in the mold. The total full compaction pressures used may vary from between one ton and as much as one hundred tons or more depending upon the size of wood fragments, species of wood used, volume and shape of the molded article and the temperature of mold and contents. The pressures here referred to are total pressures and as such will vary with the volume of a specific material being pressed. The increase in moisture content of the wood fragments above 10% makes possible the use of lesser total pressures with increased mold retention time.

As the wood and solution mix reaches molding temperature it develops an adhesive condition without, however, becoming definitely tacky or sticky, although it can be balled by pressing it in one's hands. Moreover, the wood fragments, such as chips become soft and bendable or pliable, so that they can be forced together into a dense, compact homogeneous mass. It appears that under heat and pressure the PVA-phosphoric acid combine with natural adhesive substances such as lignum in the wood to develop a strong hard impact resistant or non-chipping bond. Neither phosphoric acid or polyvinyl acetate alone have been found to develop a similar bond. The small amount of phosphoric acid indicates that it functions more as a catalyst or synergist in effecting the bond between the ingredients in the wood and the resin. Formaldehyde in the mix also appears to improve the product and increase its moisture resisting properties but a satisfactory product can be produced without it.

The preliminary dusting of the wood with starch and wood resin develops a condition favorable to the intimate spreading and coating of individual wood fragments with the PVA-phosphoric acid and water preparation and the wood resin as it softens under heat develops a strong adhesion to the wood. The starch functions both as an extender for the resin and an absorbent to hold the liquid bonding solution on the surface of the wood fragments while evaporation of excess water takes place.

Referring to FIG. 1 of the drawing, the press may comprise front and back pairs of posts upon which are a fixed top plate 3, adjustably mounted fixed intermediate plate 4, fixed bottom plate 5 and movable plate 6. Suitably suspended from plate 3 is a hydraulic cylinder 7 provided with a movable piston (not shown) from which depends a piston stem 8. A top or male mold 9 suitably secured to stem 8 has a vertical reciprocating motion with piston stem 8 and provided with guide posts 10 moving within suitable opening 13 therein through which mold 9 moves as hereinafter discussed. Secured to plate 4 and depending therefrom is a reservoir 14 having an opening 15 therethrough only slightly larger than and conforming in shape to the exterior contour of mold 9. Reservoir 14 is suitably heated by electrical resistance means (not shown) to the pressing temperature of the treated wood fragments to be charged therein.

The plate 6 at opposite sides thereof is provided with suitable means, such as air cylinders 16. Upon plate 6 is suitably mounted a female die 17 suitably heated by electrical resistance means, not shown, to the pressing temperature of the treated wood fragments to be pressed therein. Die 17 has therein a cavity 18 conforming to one half the exterior contour of one-half of a bowling (duck) pin to be formed therein. At one side of die 17 is preferably a suitable means 19 for admitting air to the die beneath the cavity therein to remove the half section of bowling pin formed in cavity 18. Where desired the male die 9 may be provided with a suitable embossment 20 thereon to displace a portion of the wood fragments in the die 17 to form one half of a hollow internal opening within the finished bowling pin or other object being formed. Preferably suitable insulation S is provided on both dies and the reservoir, as indicated, to prevent heat loss into the supporting structures therefor. The heated female mold 17 is moved by members 16 into engagement with the lower face 14a of reservoir 14 and held therein. A measured quantity of heated treated wood fragments are charged into reservoir 14 through opening 13 in plate 4 and heated male die 9 is moved downward through opening 13 in plate 4 into reservoir 14 forcing the wood fragments therein into female mold cavity 18 as the face 9a of die 9 engages face 17a of female die 17. The molds are held in this closed position for a suitable curing time as previously described. Thereafter male mold 9 is retracted and female mold returned to the position of FIG. 1, where the molded section is ejected therefrom by means of air from 19. The wood fragments are pressed at a temperature of about 210° F. for such a duck pin and a total pressure of about 30 tons (60 thousand pounds).

Figure 2:
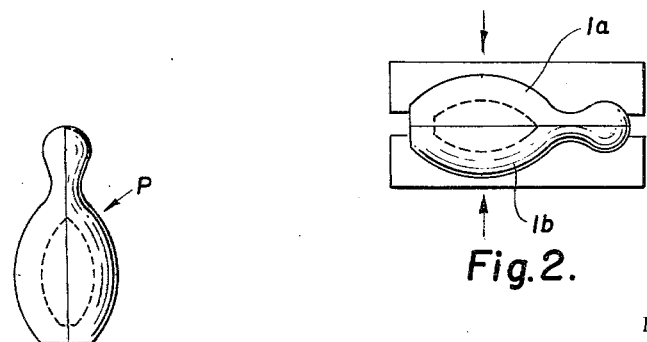
FIG. 2 shows more or less schematically the joining two such half sections together by clamping means.

As shown in FIG. 2, the bowling pin half sections 1a and 1b are placed in abutting relation at temperatures between 100° F. and 125° F. and held clamped together under a total pressure of about one ton and left to cool below 93° F. Thereafter the assembly may be removed from the clamp and allowed to set for several hours. An air clamp or a plastic bag type clamp may be used for this purpose.

Figure 3:
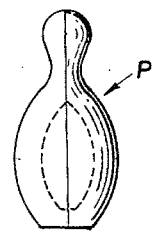
FIG. 3 is an elevation of the finished article.

FIG. 3 shows a bowling pin P as removed from the clamp. The parts bond and integrate while so clamped together and after about eight hours at room temperature the bond between the sections will be, for practical purposes at least, as strong as the sections themselves. A bowling pin indicated at P in FIG. 3 being of uniform hardness will not split, fracture or splinter during its intended use. It is of course subsequently coated with a plastic skin similar to the covering on wooden pins, for the purpose of keeping it white. If desired, a water base paint or dye may be added to the wood fragment and solution mix to color the pins.

As indicated above, the process is varied to some extent according to a predominance of certain types of wood in the mix.

Using maple, hickory, pine, birch and ash fragments the formula above described is preferable but the PVA emulsion to water ratios may be considerably modified. If the wood fragment material is predominantly or all cedar, I prefer to increase both the concentration of the PVA and the phosphoric acid. About 6% more of both resin solids and phosphoric acid are then preferred for the same weight of cedar fragments. With an increase in phosphoric acid, danger of scorching increases so the molding temperature is preferably kept in a lower range. Absolute limits will vary depending on time, density of finished product, etc.

Where the wood fragments are predominantly oak with an inherently high amount of acid in the fragments I prefer to use about 18% less phosphoric acid than with the woods of the first group (maple, hickory, etc.), and to use about 46% more of PVA. This would be true of the other more acid woods.

Example I (1) A mixture was prepared with six quarts of cornstarch, commercial grade, and one pint of wood resin (Vinsol).

(2) A bonding mixture was prepared using two quarts of polyvinyl emulsion (55% resin solids) with ten quarts of water. To this was added eight ounces of 75% phosphoric acid and four ounces of formaldehyde. This mixture was allowed to stand at room temperature for 30 to 50 minutes.

(3) The mixture of step 1 was agitated with 30 lbs. of hard maple chips, shavings and sawdust of ungraded sizes until the fragments appeared to be fairly uniformly coated with the resin-starch compound, about 50% coverage.

(4) The fragmentary wood prepared by step 3 was then mixed and tumbled with the bonding mixture of step 2 and allowed to stand at room temperature for about six hours when the free water appeared to be about 10% and the fragments were reasonably dry to the touch.

(5) The mixture was heated to about 215° F. in a heated mold in an amount to fill the mold when maximum pressure is reached. The mold was a plural cavity mold for making two half bowling pin sections.

(6) The material in the mold was held under pressure of about 42,000 lbs. total pressure for a period of about 2 minutes or about 6 to 9 seconds per ounce of mix.

(7) The two half sections were removed from the mold at temperatures of about 105° F. and found to be pliable. The sections at temperatures above 100° F. were placed together in an air clamp under a pressure of about 1000 lbs. and remained in the clamp until they had cooled to below 93° F.

(8) Upon being released from the clamp, the two halves so bonded together appeared to be completely integrated and the piece was allowed to stand for a period of about 8 hours in air at 40% to 50% humidity.

Upon testing the piece had a B scale Rockwell hardness of 50. It could not be readily sawed with a steel saw and when struck severely with a hammer would not chip or shatter.

Bowling pins so made and coated with a plastic covering such as that used on conventional wooden pins withstood far more abuse than maple pins. In various bowling tests the pins when compared to new conventional maple wood pins showed more uniform deflectability. The expected average life of a maple duck pin is from five to seven hundred games; whereas pins as here made showed no damage to the body of the pins at the impact area after more than fifteen hundred games. Conventional maple wood duck pins used in "sanctioned" league bowling are replaced after approximately 300 games because the wood beneath the plastic coating softens and splinters. The pins of Example I after removal of the plastic coating disclosed no such softening or splintering.

During all tests there appeared to be more uniform "pin action" when using bowling pins formed by the process of the invention. The exact reason for this is not as yet completely understood but appears to be the result of more uniformity in the density of any cross-sectional area of the pins of the invention.

It is well known that conventional bowling pins, particularly duck pins or small ball pins, comprise a turned and shaped member from natural maple wood stock which is covered by a close fitting nylon covering, commonly referred to as a "sock" and thereafter completely enclosed by a plastic covering. Such pins do not always react in an identical manner when struck with the bowling ball. In other words, an apparently identical "hit" by the ball does not always result in a "strike" but sometimes a "split." The reasons assigned for this is that "pin action" which results in a "strike" is different from that resulting in a split. The exact cause for this, to my knowledge, has not been determined.

I have observed that all conventional bowling pins after use in several hundred games and thereafter struck with a hard object at various points about the periphery of the pin, in the area engaged by the bowling ball, give different sounds at different points about such peripheral area. Removal of the plastic coating and "nylon sock," if any, from such a pin discloses at some areas the wood seems "soft" or crushed, whereas in other areas the wood remains hard. When the pin is struck by the ball in a "soft"

area the same "pin action" is not obtained as when the pin is struck by the ball on a "hard" area. Since pins used with an "automatic pin setter" are presumably "spotted" uniformly but may be rotated slightly during "spotting," "soft spots" on the pins may not always be positioned for impact by the bowling ball. It has also been noticed the conventional bowling pins frequently exhibit different impact resistance when struck by the ball with the grain of the wood than when struck across the grain.

Since bowling pins made under the invention can be held to close tolerances both as to weight and size, and have uniform density and greater hardness than natural wood stock about any peripheral area throughout the length of the pin, these characteristics may readily explain the uniform "action" obtained therefrom. This may also explain the longer pin life.

*Example II*

Articles made according to Example I were crushed into fragments. These fragments were reheated to about 210° F. and again pressure molded in heated dies and the article reformed in this manner was comparable to the original article. This shows the thermoplasticity of the bond and the economy from the reuse of the material where a defective piece has been made, or the reforming of mold flash, or recovery of material after use.

Where less dense material is required, lower pressures may be used in the molding operation. Also by diluting the chips, on which starch and rosin have been coated, with fresh uncoated chips or fragmentary material a softer more workable product can be secured. Greater dilution of the PVA emulsion can also be tolerated where a less dense, lighter, and more easily worked product is wanted.

The fragmentary material as prepared for molding can also be extruded or otherwise worked under heat and pressure to form rods, bars, strips and boards.

*Example III*

Using suitable dies or molds, elongated one-half cylindrical sections were formed by the process and provided with a semicircular recess extending throughout the length of the axis thereof. These half sections were then removed from the mold while hot and a metal rod having a diameter of the recess was placed in the recess. Thereafter two sections were clamped together about the rod and permitted to cool to below 93° F. when a homogeneous roller was formed, with the ends of the rod extending beyond the ends of the roller. After air hardening the rod was found to be securely clamped between the sections. It was observed that with a mold cavity to produce a 2¼" dia. roller, the hot pressed material upon removal from the mold appeared to expand about 0.001" in diameter and thereafter upon cooling and air drying shrank the same amount, that is, returned to the 2¼" diameter.

*Example IV*

Thirty pounds of cedar wood chips were dusted with eight quarts of starch-wood resin in the ratio of six parts starch to one part resin. Two quarts of polyvinyl acetate emulsion (55% solid) were mixed with ten quarts of water and about eight ounces of powdered phosphoric stone, such as used in making fertilizer. This mixture was held for about 30 to 50 minutes then about ten ounces of baking soda were added to the mixture. Thereafter the starch-resin dusted chips were added to the mixture and after stirring for about five minutes was set aside for about six hours in ambient temperature of not less than 40° F. during which time the moisture was reduced to about 10%. This mixture was then heated to about 140° F., placed in suitable molds and pressed at 7 tons total pressure to form 3 inch flower pots as a substitute for conventional clay and ceramic pots.

The addition of baking soda provided a somewhat porous product permitting passage of air and water as in the conventional clay pot. The use of cedar wood chips, sawdust and/or shavings provided suitable flower pots. The pressure used to form the heat treated comminuted wood or chips will vary depending upon hardness, strength and porosity desired, size of chips and volume of material being pressed. Such cedar wood pots when tested produced larger more healthy plants under similar conditions than when ordinary clap pots were used. Such cedar wood pots were stronger than clay pots and did not disintegrate when buried in the ground. The various colors of the cedar wood chips, sawdust, shavings and even bark produced a decorative pot. A dip coating of 12% solids quick drying lacquer increased the exterior appearance of the pot and did not impair the porosity of the pot.

The invention appears to be applicable to all common wood of commerce, including soft and hard native wood but is less satisfactory where certain peculiar wood fragments, such as teak wood, predominates in the fragments. Larger pieces of pine wood become softer in forming than hard wood so that larger coarser fragments of pine can be tolerated. Also, under like conditions predominantly hard wood fragment mixes must be pressed at higher pressures than soft wood fragments to secure the same density.

The finished molded product is mostly wood fragments, since the percentage of added bonding material used with thirty pounds of chips is relatively small, and these fragments are clearly apparent on the surface of the finished piece. The product manifests water resistance or moisture resistance, and will not burn in an open flame but will char at higher temperatures. It is economical to use, especially in preformed shapes. It is a poor conductor of electricity.

While I have described certain specific formulae, temperatures and pressures, a wide latitude is permitted, depending upon the wood used, the maximum size of the fragments, the density desired and the degree of hardness and strength required in the finished piece.

Experimentation indicates the preliminary starch-resin coating of the wood chips, sawdust, etc. may be omitted, with some loss of hardness and density in the finished product of the invention. The reason for this is not presently established. When, however, about a 50% preliminary coating of the starch-resin mixture is applied, the starch seems to improve penetration of the polyvinyl acetate-water-phosphoric acid mixture into the wood. The resin may serve as a preliminary binder. When formaldehyde is added to the polyvinyl acetate-water-phosphoric acid mixture it seems to act as a hardener for the finished product.

Although a polyvinyl acetate-water solution alone will serve as a binder for the wood particles when heated and pressed, a vastly inferior product results. Such a solution acts only as a simple adhesive. When, however, the phosphoric acid is added to the polyvinyl acetate-water solution some form of reaction takes place with the wood. Although the exact nature of the reaction is not presently known the phosphoric acid plus the polyvinyl acetate appears to reactivate the natural wood resins and thus change the characteristics of the wood making it pliable and compactable under heat and pressure. This may explain why sawdust alone gives an inferior product as compared to use of chips and sawdust to produce a harder, stronger and more abrasive resistant product. It has been further observed that for any given pressure used with the process, reduction in the amount of water in the polyvinyl acetate-water-phosphoric acid solution used to treat the wood chips and sawdust gives a product of increased initial strength and hardness for any given wood species. However, air drying of the finished product reduces the moisture content, hence although green wood chips may require greater pressing pressure than kiln dried chips, subsequent air drying and moisture loss provides greater strength and density in the product.

I claim:

1. The method of producing an article from wood fragments which comprises mixing the wood fragments with a liquid bonding and wood treating solution comprising a previously prepared 5 to 1 mixture of water and polyvinyl acetate emulsion of about 55% acid content to which is added phosphoric acid in a ratio of one part acid to 40 to 50 parts mixture, thereafter setting the mixed fragments and treating solution aside in an atmosphere of at least 40° F. until the solution has been substantially absorbed and reacted with the wood, then uniformly heating a mass of the fragments so treated and compacting the heated mass under pressure in a suitable mold at temperatures between 90° F. and 260° F.

2. The method of producing articles from wood fragments as defined in claim 1 wherein the wood fragments are first dusted to about 50% coverage with a mixture of wood resin and starch serving as a solution absorbent.

3. The method of producing articles from wood fragments as defined in claim 2, wherein the polyvinyl acetate emulsion as resin solids substantially exceeds the phosphoric acid.

4. The method of producing articles from wood fragments as defined in claim 2, wherein the polyvinyl acetate emulsion as resin solids substantially exceeds the phosphoric acid in the ratio of roughly two quarts of polyvinyl acetate emulsion of 55% resin solids to eight ounces of 75% phosphoric acid, the solution having in addition adequate water to coat and wet about 30 pounds of wood fragments.

5. The method of producing articles from wood fragments as defined in claim 2 wherein the pressing temperature is greater than 93° F. and below the scorching temperature of the coated chips.

6. The method of producing articles from wood fragments as defined in claim 2 wherein the pressing temperature is in the range of 100° F. to 263° F. for a period of time sufficient to develop a bond between the wood fragments and the natural bonding substances inherent in the wood.

7. The method of shaping wood fragments into articles of manufacture comprising the steps of, forming a wood fragment bonding and treating solution of polyvinyl acetate emulsion, water and phosphoric acid in the ratio of about eight ounces of 75% phosphoric acid to 12 quarts of a mixture of one part polyvinyl acetate emulsion (55% resin content) and 1 to 50 parts water, mixing the wood fragments with the wood treating solution in the ratio of about 30 lbs. of wood fragments to about 12 quarts of the treating solution, letting the mixture of wood fragments and solution stand for about 6 hours at above 40° F. for reaction with the wood fragments and reduction of the moisture content to about 10% then molding under heat and pressure to the desired shape using pressures of 1 to 50 tons or more at temperatures between above 90° F. and below 265° F.

8. The method as defined in claim 7 wherein the wood fragments are pre-coated with one quart of a starch-resin mix in the ratio of 6 parts starch to one part wood resin.

9. The method as defined in claim 7 wherein about 4 oz. of formaldehyde is added to the wood treating solution when the wood fragments are mixed therewith.

10. The method as defined in claim 8 wherein about 4 oz. of formaldehyde is added to the wood treating solution when the wood fragments are mixed therewith.

11. The method as defined in claim 7 wherein the article of manufacture is first pressed into open half molds, the pressed wood fragments are removed from the half molds while at temperatures above 100° F. and thereafter clamped together and allowed to cool below 95° F. to form a homogeneous bonded article.

12. The method as defined in claim 11 wherein the wood fragments within each half mold are engaged by a pressing face to define a hollow cavity in each pressed half section before assembly.

13. The method of forming porous flower pots from cedar wood fragments comprising the steps of, forming a cedar wood treating solution of polyvinyl acetate emulsion, water and powdered phosphoric stone in the ratio of about 8 oz. of powdered stone to 12 quarts of a mixture of two parts polyvinyl acetate emulsion (55% resin content) and 10 parts water, setting the solution aside for about 20 to 50 minutes and then adding thereto about 10 oz. of soda to each 12 quarts of solution, mixing 30 lbs. of cedar wood fragments with 12 quarts of the treating solution, letting such mixture stand for about 6 hours in an ambient temperature above 40° F. for reaction between solution and wood fragments and reduction of moisture content of the mix to about 10%, then heating the mixture to about 140° F. and pressing in suitable size similarly heated molds at pressures of about 7 tons for a 3″ pot and corresponding larger pressures for larger pots.

14. The method as defined in claim 13, wherein formaldehyde in ratios of about 4 oz. to 12 quarts of wood treating solution is added to the solution before mixing with the wood fragments.

15. The method as defined in claim 13 wherein the 20 lbs. of cedar wood fragments are pre-coated with 8 quarts of a mixture of starch and resin in the ratio of 6 parts starch to 1 part resin.

References Cited by the Examiner

UNITED STATES PATENTS

| | | | |
|---|---|---|---|
| 726,029 | 4/1903 | Classen | 264—124 XR |
| 1,205,278 | 11/1916 | Skalla | 273—82 |
| 1,663,505 | 3/1928 | Mason. | |
| 2,190,909 | 2/1940 | Phillips et al. | 106—163 |
| 2,687,556 | 8/1954 | Othmer et al. | 264—124 XR |
| 2,759,837 | 4/1956 | Roberts | 18—47.5 XR |
| 2,779,683 | 1/1957 | Gill | 264—124 XR |
| 2,789,903 | 4/1957 | Lukman et al. | 260—17.4 XR |
| 2,984,580 | 5/1961 | Glab | 264—124 XR |

ALEXANDER H. BRODMERKEL, *Primary Examiner.*